United States Patent [19]

Hazenbroek

[11] Patent Number: 4,574,429
[45] Date of Patent: Mar. 11, 1986

[54] POULTRY HALVING METHOD AND APPARATUS

[76] Inventor: Jacobus E. Hazenbroek, Burg de Zeeuwstraat 52, Numansdorp, Netherlands

[21] Appl. No.: 513,005

[22] Filed: Jul. 12, 1983

[51] Int. Cl.$^4$ ............................................. A22C 21/00
[52] U.S. Cl. ............................................. 17/52; 17/11
[58] Field of Search ........................................ 17/11, 52

[56] References Cited

U.S. PATENT DOCUMENTS

| | | | |
|---|---|---|---|
| 2,941,238 | 6/1960 | Reeves | 17/11 |
| 3,518,718 | 7/1970 | Barefield | 17/52 |
| 3,624,863 | 12/1971 | Gasbarro | 17/11 |
| 3,886,635 | 6/1975 | Meyn | 17/11 |
| 3,958,302 | 5/1976 | Meyn | 17/11 |
| 4,059,868 | 11/1977 | Meyn | 17/11 |
| 4,251,901 | 2/1981 | Thomas et al. | 17/11 |
| 4,265,001 | 5/1981 | Hathorne | 17/11 |
| 4,382,314 | 5/1983 | Graham | 17/11 |
| 4,467,500 | 8/1984 | Olson | 17/11 X |

FOREIGN PATENT DOCUMENTS 8101527 10/1982 Netherlands .......................... 17/11

OTHER PUBLICATIONS

*Auto-Cone Breast Deboning Systems*, Models No. CCBD1 and CCBD1-S, Pritchard Sales Co., (Leaflet, both sides).

*Primary Examiner*—Willie G. Abercrombie
*Attorney, Agent, or Firm*—Thomas & Kennedy

[57] ABSTRACT

Birds are moved in series along an overhead conveyor about a rotary support assembly 22, a spreader tool 45 moves down into the previously eviscerated cavity of each bird, a first disk cutter 68 cuts behind the spreader tool through the tissue extending from the breast to the back about the cavity, the spreader tool is withdrawn from the bird, and a second disk cutter 69 cuts through the backbone of the bird.

12 Claims, 8 Drawing Figures

POULTRY HALVING METHOD AND APPARATUS

BACKGROUND OF THE INVENTION

This invention relates in general to a method and apparatus for cutting previously eviscerated birds in half while the birds are carried on an overhead conveyor through a poultry processing plant, with a cut being formed between the breast and the saddle of the bird, through the backbone of the bird.

In the processing of edible poultry in a poultry processing plant, it is desirable to perform as many of the processing steps as possible with mechanical devices so as to minimize the amount of labor required for processing each bird. For example, in a modern poultry processing plant, live birds are suspended by their legs from an overhead conveyor system, and as many as possible of the processing steps are performed on the birds as the birds are conveyed through a series of work stations and before the birds are removed from the conveyor system. Usually, the birds are electrically stunned, their jugulars are cut, the birds are scalded and defeathered while suspended on an overhead conveyor. The birds are then moved on a conveyor system through the evisceration process, where their vents are cut out, the visceral cavities are opened, and the birds are eviscerated.

After the birds have been eviscerated, the birds can be further processed for marketing in a whole condition, or the birds can be cut apart for marketing in pieces. If the birds are to be cut apart, it would be desirable to perform as many cutting functions as possible with mechanical means while the birds are still being carried by the overhead conveyor system.

SUMMARY OF THE INVENTION

Briefly described, the present invention comprises a method and apparatus for cutting previously eviscerated poultry or birds while the birds are still being moved in sequence along an overhead conveyor system in a poultry processing plant, with the cut being formed between the breast and the saddle toward the backbone of the bird, through the side tissue extending between the breast and the saddle and about the visceral cavity of the bird so as to separate the saddle from the breast. In addition, a second cutting function can be performed on the bird which severs the backbone of the bird. This second severing step is performed so that the back but not all of the adjacent tissue is severed, which leaves the breast suspended from the saddle of the bird, and the breast and the saddle can continue to move together with the overhead conveyor system even though the breast has been substantially separated from the saddle.

The apparatus comprises a rotary support member that is rotatable about a vertical axis in response to the movement thereabout of the overhead conveyor of the processing plant. The rotary support member includes a work cylinder extending thereabout against which the birds are placed, and a plurality of V-shaped spreader tools are positioned at circumferential intervals about the work cylinder and move both circumferentially in unison with the work cylinder and vertically so as to move downwardly and into the visceral cavity of the birds to spread the breasts apart from the backs of the birds. The spreader tools and birds move with the work cylinder and the birds are carried to a pair of disk cutters. The first disk cutter cuts behind the V-shaped spreader tool through the side tissue of the birds, the spreader tools are then withdrawn from the birds, and the second disk cutter is received into the previously cut portion of the bird and engages the backbone to sever the backbone and some of the surrounding tissue. The birds are then moved away from the work cylinder by the overhead conveyor system to a subsequent work station with the breast substantially separated from the saddle and suspended therefrom by some of the tissue at the backbone.

Thus, it is an object of this invention to provide a method and apparatus for cutting apart previously eviscerated poultry carcasses as the poultry carcasses are conveyed by an overhead conveyor system in a poultry processing plant without interrupting the other processing steps.

Another object of this invention is to provide a method and apparatus for cutting through previously eviscerated poultry carcasses that are suspended by their legs from an overhead conveyor system and moved from an eviscerating work station toward a subsequent work station, with a cut being made between the breast and the saddle of each bird to separate the breast from the saddle.

Another object of this invention is to provide apparatus for cutting poultry carcasses as the carcasses are conveyed along an overhead conveyor system away from a poultry eviscerating station, with the apparatus being inexpensive to construct and maintain, and which functions at speed compatible with the poultry processing line to form accurate cuts in the carcasses of the birds.

Other objects, features and advantages of the present invention will become apparent upon reading the following specification, when taken in conjunction with the accompanying drawings.

DETAILED DESCRIPTION

Figure 1:
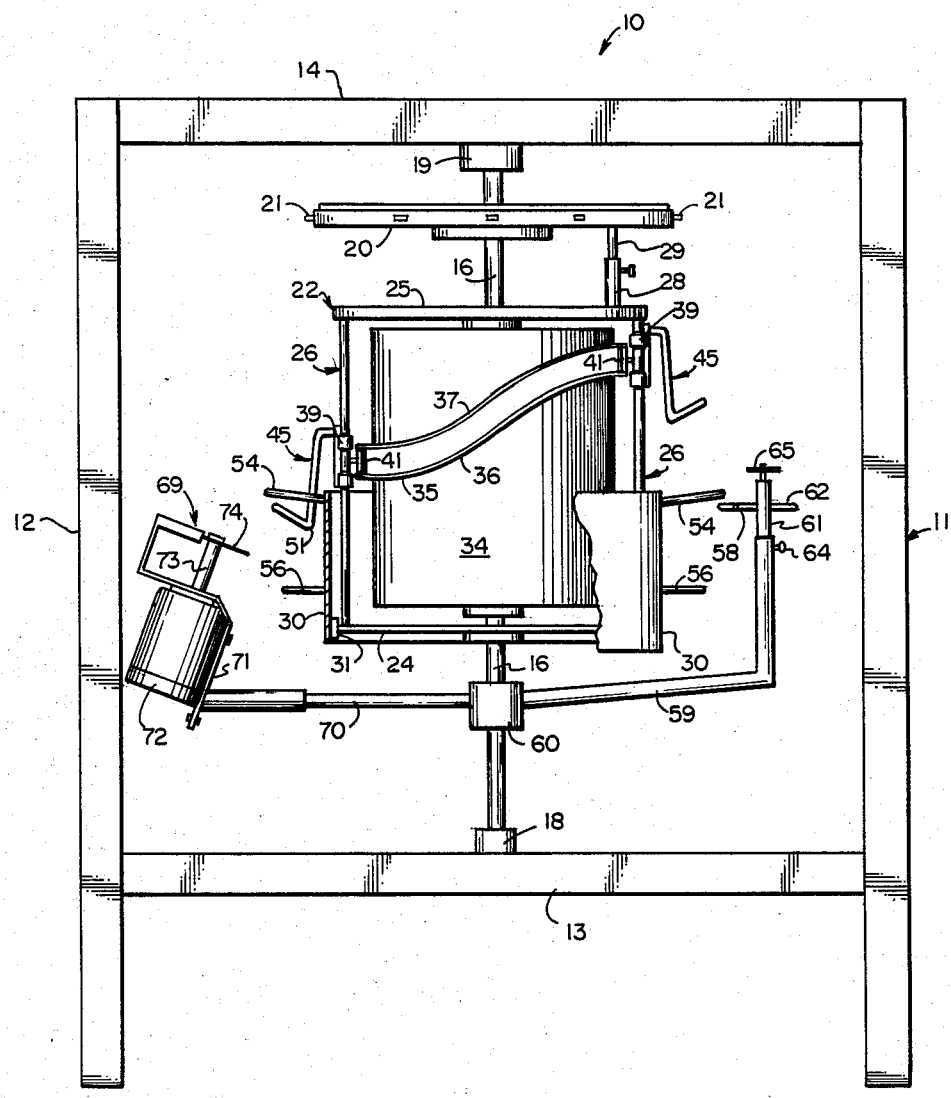
FIG. 1 is a side elevational view of the poultry halving apparatus, with several of the spreader tools, guide bars and slide blocks removed from the apparatus and with a portion of the work cylinder removed so as to illustrate the inner workings of the apparatus.

Referring now in more detail to the drawings, in which like numerals indicate like parts throughout the several views, FIG. 1 illustrates a poultry halving apparatus 10 which includes a support framework 11 for placement in alignment with a conventional overhead conveyor system of the type utilized in poultry processing plants. The framework 11 includes vertical supports 12, lower horizontal support 13 mounted at its ends to vertical supports 12 at a distance spaced above the floor surface of the processing plant, and upper horizontal support 14 joined to the top portions of the vertical supports 12.

Vertical support bar 16 extends between lower and upper horizontal supports 13 and 14 and is rigidly mounted thereto by appropriate mounting blocks 18 and 19. Drive wheel 20 is rotatably mounted to the upper vertical support bar 16, and its peripheral teeth 21 engage the drive chain of the overhead conveyor system (not shown) of the poultry processing line. When the conveyor line moves, it rotates the drive wheel 20 about the vertical support bar 16.

As illustrated in FIG. 1, rotary support assembly 22 is positioned below drive wheel 20 and is rotatably mounted to vertical support bar 16. Rotary support assembly 22 includes lower support disk 24, upper support disk 25 and a plurality of pairs of vertically oriented parallel guide bars 26 mounted to and extending between the lower and upper support disks 24 and 25. The pairs of vertical guide bars 26 are equally spaced about the peripheral edge portions of the lower and upper support disks 24 and 25. Telescopic connector 28 is mounted to the upper portion of upper support disk 25 and its connector bar 29 can be projected upwardly into engagement with drive wheel 20 so that the rotation of the drive wheel by the conveyor line results in rotation of the rotary support assembly 22 about the vertical support bar 16.

Rotary support assembly 22 further includes work cylinder 30 that surrounds the lower portions of the gudie bars 26 and the lower support disk 24, and is mounted to the lower support disk 24 by connector blocks 31. The work cylinder rotates in unison with the remaining elements of rotatary support assembly 22 about the vertical support bar 16. Therefore, vertical support bar 16 functions as a vertical axis of rotation for the entire rotor support assembly 22.

Stationary cam drum 34 is also mounted to vertical support bar 16. Cam drum 34 includes a cylindrical outer surface extending coaxially about vertical support bar 16, and a helical cam track 35 extends about the cam drum. Cam track 35 includes lower and upper spaced ledges 36 and 37 which form a helical cam recess.

Figure 2:
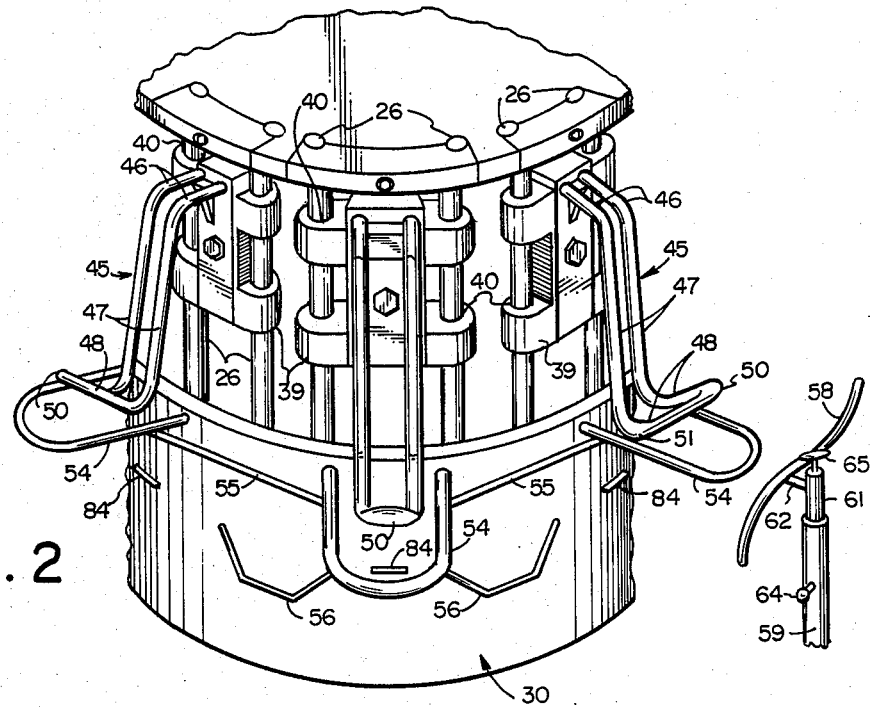
FIG. 2 is a detail perspective illustration of the poultry halving apparatus.

As best illustrated in FIGS. 1 and 2, a slide block 39 is slidably mounted to each pair of guide bars 26. Each slide block includes vertical openings 40 which extend therethrough and which surround the guide bars 26, and a cam wheel 41 (FIG. 1) is rotatably mounted to each slide block. The cam wheel of each slide block is positioned between the slide block and the cam drum and is arranged to be received in the helical cam track 35. With this arrangement, as the rotary support assembly 22 rotates about vertical support bar 16, the cam wheels 41 of the slide blocks 39 will follow the cam track, causing the slide blocks to reciprocate along the guide bars 26.

A spreader tool 45 is mounted to each slide block 39 and moves in unison with its slide block. As illustrated in FIG. 2, each spreader tool comprises a single length of bar material bent intermediate its ends into parallel pairs of segments which include horizontally-extending support segments 46, vertical segments 47, and upwardly inclined segments 48. The free ends of the horizontal support segments 46 are rigidly mounted to the slide block, while the upwardly inclined end portions of the upwardly inclined segments 48 are formed in a closed U-shape 50. The horizontal support segments 46 are of a length sufficient to locate the vertical segments 47 at a position spaced outwardly of the work cylinder 30, and the vertical segments and the upwardly inclined segments 48 together form an acute angle with each other to form a V-shape, with the apex 51 of the V-shape being located at the lower portion of the spreader tool.

As best illustrated in FIG. 2, a series of U-shaped leg-positioning guides 54 are attached to the work cylinder 30 at spaced intervals thereabout, with the ends of the U-shaped guides being rigidly attached to the work cylinder. The U-shaped guides are inclined upwardly from the work cylinder. Each U-shaped guide is located in vertical alignment with a spreader tool 45, and the size of each U-shaped guide is sufficient to permit the spreader tool to move downwardly through the opening formed by the U-shaped guide. Leg abutment struts 55 are connected at their ends to adjacent ones of the U-shaped leg positioning guides 54 and are located in spaced relationship with respect to work cylinder 30. Back guides 56 are also approximately U-shaped and have their ends rigidly connected to the work cylinder and protrude horizontally therefrom. The back guides 56 are located lower than and generally between adjacent ones of the spreader tools 45 and U-shaped leg positioning guides 54.

As illustrated in FIG. 1, guide bar 58 is supported in a stationary position adjacent the work cylinder 30 by L-shaped support arm 59. The support arm 59 is connected by connector block 60 to the vertical support bar 16, and the upwardly extending arm of the L-shaped arm 59 telescopically receives bar support 61. Horizontally extending bar 62 extends through an opening of bar support 61, and the guide bar 58 is rigidly mounted to bar 62. The position of guide bar 58 can be adjusted by loosening the set screws 64 and 65 and moving the elements with respect to one another, and retightening the set screws.

First and second disk cutters 68 and 69 are supported adjacent the work cylinder 30 by means of horizontally extending support arms 70 connected at one end to connector block 60 and connected at its radially-extending end to a support plate 71. An electric motor 72 is mounted on the support plate 71, and the shaft 73 of the motor is connected to a cutting disk 74. While only the second disk cutter 69 is shown in detail, it will be understood that the first disk cutter is identical thereto except for its blade size and its angle of orientation, its position about the work cylinder 30 and its elevation with respect to the work cylinder. The height, attitude and other positional features of each disk cutter can be adjusted as necessary to locate the cutting disk in the proper location by adjusting means (not shown) which are generally similar to the adjusting means of guide bar 58.

OPERATION

When the overhead conveyor system is in operation and moves previously eviscerated poultry carcasses 75 through the poultry processing system, the movement of the conveyor about the drive wheel 20 of the poultry halving apparatus 10 causes the drive wheel to rotate about vertical support bar 16. The rotation of the drive wheel results in corresponding rotation of the rotary support assembly 22. As the rotary support assembly 22 rotates, the spreader tools 45 also rotate about the vertical support bar 16, and their cam wheels 41 follow the cam track 35, causing reciprocation of the spreader tools.

When the birds 75 move in sequence about the poultry halving apparatus 10, the birds are first contacted by the guide bar 58 which urges each bird toward the work cylinder 30. The U-shaped leg positioning guides 54 (FIG. 2) move between the legs of each bird so as to hold the legs apart and to cause the previously opened visceral cavity of each bird to be located beneath a U-shaped guide 54. The leg abutment struts 55 hold the legs at the proper distance away from the work cylinder 30 so that the visceral cavity of each bird will be properly located beneath the opening defined by the U-shaped leg positioning guide 54. The back guides 56 positioned below and between the U-shaped leg guides 54 tend to guide the backs of the birds into alignment beneath the U-shaped leg guides 54 and hold the birds in proper location as the birds move about the rotary support assembly.

Figure 4:
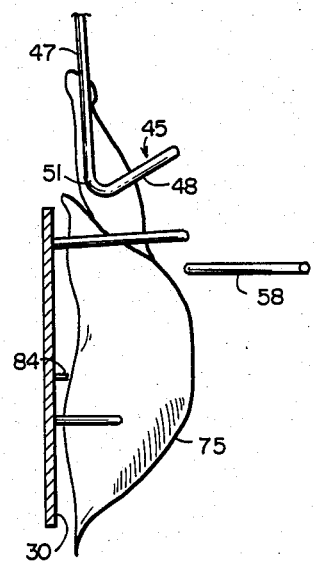
FIGS. 4–8 are progressive illustrations of a bird as the spreader tool is moved into the bird, the first cut is made through the bird, the tool is withdrawn from the bird and the second cut is made.
Figure 5:
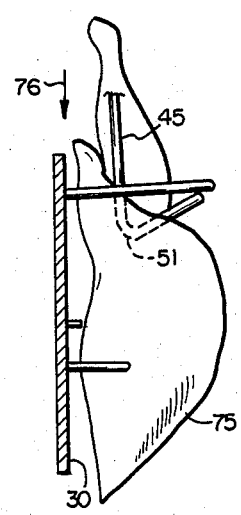
Figure 6:
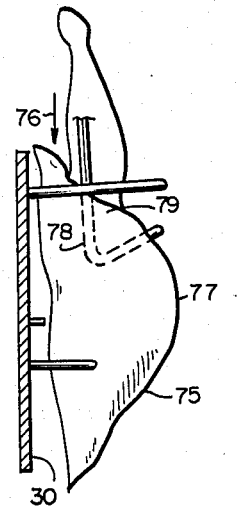

As illustrated in FIG. 4, as each bird 75 is first received by the apparatus its V-shaped spreader tool 45 will have been moved by the cam track 35 to an up position where the tool is positioned above the bird. When considering the movement of one bird about the apparatus, the V-shaped spreader tool 45 begins its downward movement as indicated by arrow 76, and the apex 51 of the spreader tool tends to guide itself into the visceral cavity of the bird. The vertical segments 47 of the spreader tool tend to slide along the visceral cavity and in contact with the back of the bird, thereby tending to hold the bird in proper position as the spreader tool continues to enter the bird (FIG. 6), while the upwardly inclined segments 48 of the spreader tool tend to engage the breast of the bird and push the breast away from the back of the bird.

When the spreader tool 45 has moved to its full down position (FIG. 7), the breast 77 will have been stretched away from the back 78, with the tissue 79 of the bird that extends between the breast and back about the visceral cavity having been stretched taught. When the bird is in this condition, the bird reaches the first disk cutter 68 and the bird is carried to the disk cutter, with the cutting disk 74 extending at a sloped angle down into the V-shaped spreader tool toward the apex 51 of the spreader tool, with the disk 74 located above the upper inclined segments 48 of the spreader tool. The first disk cutter 68 cuts through the tissue 79 that joins the breast to the back and which extends about the visceral cavity of the bird. This further opens the bird to the extent that the breast tends to hang in a relaxed position from the back of the bird.

Figures 7, 8:
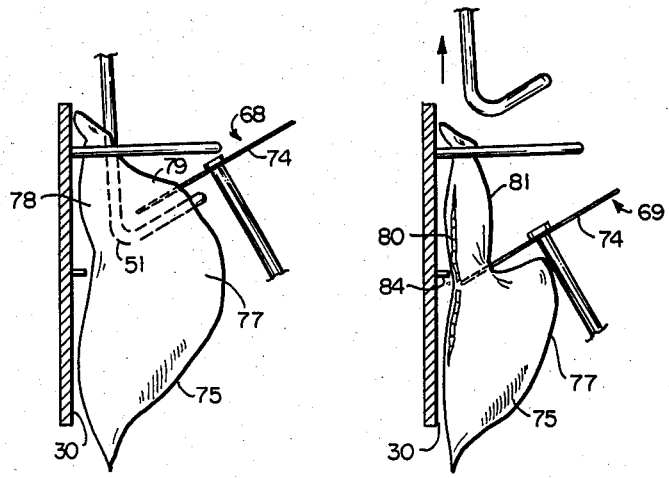
Figure 3:
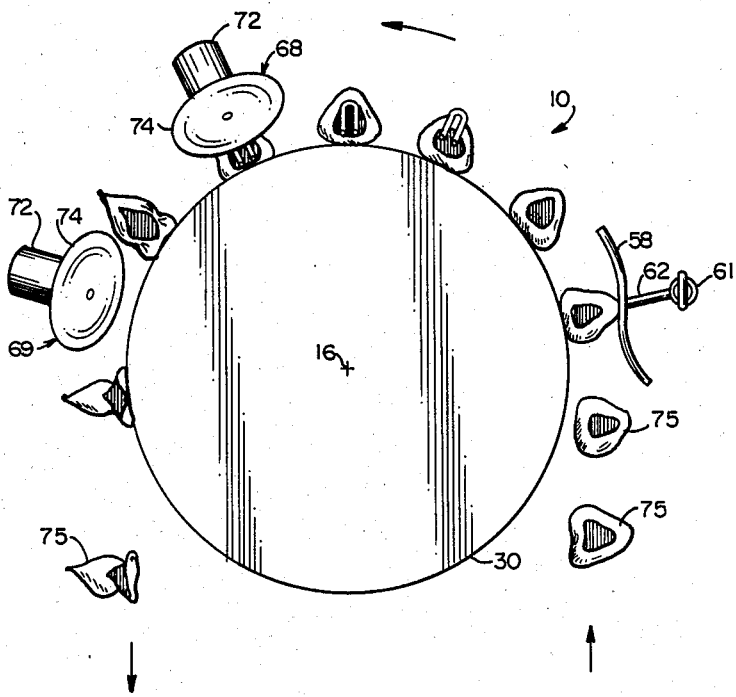
FIG. 3 is a schematic plan view of the poultry halving apparatus, showing the birds as they move around the apparatus and are cut as they move around the apparatus.

As the bird 75 moves beyond the first disk cutter 68, the spreader tool 45 is moved upwardly by the cam track 35. The upward movement of the spreader tool together with the cutting of the side tissue of the bird results in the tool being free to move back up through the U-shaped leg positioning guide 54. When the spreader tool has reached this position, the bird 75 is moved to the second disk cutter 69 (FIG. 8). The cutting disk 74 of the second disk cutter 69 reaches further toward the work cylinder 30 so as to reach the backbone 80 of the bird, and to sever the backbone and most of the surrounding tissue. This causes the breast 77 to remain suspended from the saddle 81 of the bird by the small amount of uncut tissue that is located about the backbone 80.

After the bird has been cut by the second disk cutter, the bird then continues to move with the overhead conveyor system on to the next processing station.

In order to assist in the cutting function of the backbone, small protrusions 84 are mounted to the work cylinder 30 beneath each U-shaped leg positioning guide 54. The protrusions are located at a height that is slightly above the edge of the cutting disk 74 of the second disk cutter 69, so that the small protrusion engages the backbone and holds the backbone steady as the cutting disk cuts slightly below the protrusion. This assists in the severing function of the cutting disk.

The spreader tool 45 has been described as being an open V-shape and as being fabricated from bar material bent into parallel segments. This configuration, enhances the cleaning of the equipment by water spray, so that contaminants from one bird will not be carried about the machine to other birds. However, it will be understood by those skilled in the art that other configurations of the spreader tool can be utilized to achieve similar functions.

While this invention has been described in detail with particular reference to a preferred embodiment thereof, it will be understood that variations and modifications can be effected within the spirit and scope of the invention as described hereinbefore and as defined in the appended claims.

I claim:

1. A method of cutting apart previously eviscerated poultry carcasses comprising the steps of
   moving a V-shaped spreader tool into the cavity of a bird to spread the breast away from the back,
   cutting behind the tool through the tissue extending from the breast to the back about the cavity,
   withdrawing the tool from the bird, and
   cutting through the backbone and a portion of the tissue about the backbone,
   whereby the saddle and the breast of the bird remain attached only by the tissue at the backbone.

2. The method of claim 1 and further including the steps of moving the bird in a legs-up attitude along a conveyor path around a rotary support member, rotating the rotary support member about a vertical axis in unison with the movement of the birds along the conveyor path, and wherein the step of moving a V-shaped spreader tool into the previously eviscerated cavity of a bird comprises moving the V-shaped tool in a circular path with the rotary support member and downwardly with the apex of the V-shape moving first into the cavity of the bird, and wherein the step of cutting behind the tool comprises moving the bird and the tool with the rotary support member past a cutting blade extending over a portion of the V-shaped tool and toward the apex of the V-shape.

3. The method of claim 1 and wherein the step of cutting through the backbone comprises extending a cutting tool into the space of the bird formed by the previous cut between the breast and backbone.

4. A method of cutting apart previously eviscerated poultry carcasses comprising the steps of
   moving a series of birds each in a legs-up attitude along a conveyor path about a rotary support member,
   rotating the rotary support member about a vertical axis in unison with the movement of the birds along the conveyor path,
   moving a plurality of spreader tools spaced circumferentially about the rotary support member in a circular path with the roatary support member,
   reciprocating the spreader tools vertically as the spreader tools move in the circular path to move the spreader tools downwardly into the cavities of the birds moving about the rotary support member and then upwardly away from the birds, cutting the birds between the breast and the back when the spreader tools have been moved downwardly into the cavities of the birds, and cutting the backbones of the birds after the spreader tools have been moved upwardly away from the birds and as the birds continue to move about the rotary support member.

5. Apparatus for cutting previously eviscerated poultry carcasses as the poultry carcasses are moved in series in an inverted attitude along an overhead conveyor, said apparatus comprising:

a rotary support member rotatable about a vertical axis in response to the movement thereabout of the conveyor for receiving the birds moving with the conveyor, a plurality of spreader tools positioned about and movable circumferentially with the rotary support member about the vertical axis for engaging the birds received by the rotary support member, means for reciprocating said spreader tools as the spreader tools move about the vertical axis so that the spreader tools move downwardly to enter the cavity of a bird and then move upwardly away from its bird, a first cutting means positioned adjacent the path of the spreader tools for cutting into the birds above a portion of the spreader tools inserted into the cavities of the birds, and wherein said spreader tools are approximately V-shaped and are oriented with the apex extending downwardly whereby the apex of the spreader tools enter the cavity of a bird and the first cutting means extends at an angle extending downwardly from above the spreader tool toward the apex of the spreader tool.

6. Apparatus for cutting previously eviscerated poultry carcasses as the poultry carcasses are moved in series in an inverted attitude along an overhead conveyor, said apparatus comprising:

a rotary support member rotatable about a vertical axis in response to the movement thereabout of the conveyor for receiving the birds moving with the conveyor, a plurality of spreader tools positioned about and movable circumferentially with the rotary support member about the vertical axis for engaging the birds received by the rotary support member, means for reciprocating said spreader tools as the spreader tools move about the vertical axis so that the spreader tools move downwardly to enter the cavity of a bird and then move upwardly away from its bird, a first cutting means positioned adjacent the path of the spreader tools for cutting into the birds above a portion of the spreader tools inserted into the cavities of the birds, and a second cutting means positioned adjacent the path of the spreader tools for cutting below the spreader tools into the birds after the spreader tools have moved upwardly away from the birds.

7. Apparatus for cutting previously eviscerated poultry carcasses as the poultry carcasses are moved in series in an inverted attitude along an overhead conveyor, said apparatus comprising:

a rotary support member rotatable about a vertical axis in response to the movement thereabout of the conveyor for receiving the birds moving with the conveyor, a plurality of spreader tools positioned about and movable circumferentially with the rotary support member about the vertical axis for engaging the birds received by the rotary support member, means for reciprocating said spreader tools as the spreader tools move about the vertical axis so that the spreader tools move downwardly to enter the cavity of a bird and then move upwardly away from its bird, a first cutting means positioned adjacent the path of the spreader tools for cutting into the birds above a portion of the spreader tools inserted into the cavities of the birds, wherein said rotary support member comprises a plurality of pairs of parallel, vertically oriented guide bars positioned circumferentially about the vertical axis of the rotary support member, a slide block slidably mounted on each pair of guide bars, said spreader tools each mounted to a slide block, and wherein said means for reciprocating said spreader tools comprises cam means for reciprocating said slide blocks in response to the rotation of said rotary support member about its vertical axis, and wherein said rotary support member includes a work cylinder surrounding said guide bars for receiving birds thereagainst, guide protrusions mounted to the external surface of said work cylinder for maintaining birds in predetermined positions about the work cylinder, and wherein said spreader tools each are shaped so as to extend downwardly from its slide block about said work cylinder.

8. A method of cutting apart previously eviscerated poultry carcasses comprising stretching the breast of a bird away from the back of the bird at the vent opening of the bird, cutting through the tissue of the bird about the visceral cavity between the breast and the back to lay the bird open, and cutting transversely through the backbone of the bird so as to sever it into longitudinal segments.

9. The method of claim 8 and wherein the step of cutting through the backbone of the bird comprises severing the backbone without severing all of the tissue of the backbone so that the saddle of the bird and the breast of the bird remain connected together at the backbone.

10. The method of claim 8 and wherein the step of cutting through the backbone of the bird comprises inserting a cutting tool through the previously cut portion of the bird.

11. The method of claim 8 and wherein the step of stretching the breast of a bird away from the back of the bird comprises inserting a V-shaped tool into the visceral cavity of the bird with opposed exterior surfaces of the V-shaped tool engaging nad wedging apart the breast and back of the bird, and wherein the step of cutting through the tissue of the bird about the visceral cavity comprises moving the cutting blade and the V-shaped tool with respect to each other with the cutting blade passing through the recess of the V-shaped tool.

12. The method of claim 11 and further including the step of withdrawing the V-shaped tool from the bird before cutting through the backbone of the bird.

* * * * *